United States Patent [19]

Pellerin

[11] Patent Number: 5,497,411

[45] Date of Patent: Mar. 5, 1996

[54] TELECOMMUNICATIONS CARD-ACCESS SYSTEM

[76] Inventor: Joseph C. E. Pellerin, R.R. 2, Belleville, Ontario, Canada, K8N 4Z2

[21] Appl. No.: 209,724

[22] Filed: Mar. 14, 1994

[51] Int. Cl.⁶ ........................................ H04Q 7/38
[52] U.S. Cl. .............. 379/59; 379/200; 379/357
[58] Field of Search .................. 379/59, 67, 88, 379/199, 200, 357; 340/825.31, 825.34, 825.5, 825.51; 380/23; 235/380

[56] References Cited

U.S. PATENT DOCUMENTS

| | | |
|---|---|---|
| 4,211,919 | 7/1980 | Ugon . |
| 4,634,845 | 1/1987 | Hale ........................................ 235/379 |
| 4,742,215 | 5/1988 | Daughters et al. . |
| 4,759,056 | 7/1988 | Akiyama . |
| 4,763,354 | 8/1988 | Fukushima et al. . |
| 4,900,903 | 2/1990 | Wright et al. . |
| 4,922,521 | 5/1990 | Krikke et al. . |
| 4,961,217 | 10/1990 | Akiyama . |
| 5,020,105 | 5/1991 | Rosen et al. . |
| 5,022,067 | 6/1991 | Hughes . |
| 5,048,085 | 9/1991 | Abraham et al. . |
| 5,097,505 | 3/1992 | Weiss ........................................ 380/23 |
| 5,121,126 | 6/1992 | Clagett ...................................... 379/59 |
| 5,153,906 | 10/1992 | Akiyama . |
| 5,181,238 | 1/1993 | Medamana et al. . |
| 5,282,247 | 1/1994 | McLean et al. ........................... 380/23 |
| 5,335,276 | 8/1994 | Thompson et al. ....................... 380/23 |
| 5,384,834 | 1/1995 | Sato .......................................... 379/357 |
| 5,440,625 | 8/1995 | Akiyama ................................... 379/199 |

FOREIGN PATENT DOCUMENTS

| | | |
|---|---|---|
| 2016935 | 11/1990 | Canada . |
| 1293325 | 12/1991 | Canada . |
| 1299258 | 4/1992 | Canada . |
| 1298653 | 4/1992 | Canada . |

OTHER PUBLICATIONS

British Telecommunications Engineering article "Personal Communications in the Intelligent Network", by Sádaba, vol. 9, Aug. 1990.

*Primary Examiner*—Dwayne D. Bost
*Attorney, Agent, or Firm*—Killworth, Gottman, Hagan & Schaeff

[57] ABSTRACT

The present invention is directed to a access-control system for a telecommunication network which connects a serving telecommunication system to a plurality of telecommunication access terminals, comprising: at least one portable memory devices card, for storing a resident PIN and a number of access authorization codes and associated identification data; an access-control module for connection to a telecommunications access terminal, comprising user's interface means for communication between the user and said module, means for reading said resident PIN, means for validating an user's PIN input on said user's interface means for accessing said number of access authorization codes and associated identification data on said card, means for selecting a transaction profile on said user's interface means, means for transmitting a selected access authorization code and associated identification data for said transaction profile associated to said validated resident PIN to said serving telecommunication system over said network for executing a transaction defined by said transaction profile.

18 Claims, 5 Drawing Sheets

TELECOMMUNICATIONS CARD-ACCESS SYSTEM

BACKGROUND OF THE INVENTION

1. Field of the Invention

The present invention is directed to a telecommunications access-control system. More particularly, the present invention is concerned with an access-control device and method for providing a password protected interface between a serving system (as for example Private Branch Exchange, Voice-Mail and Cellular systems) and a plurality of access codes resident in a user's memory device.

2. Description of the Related Art

Public and private communication networks use switching systems referred to as Central Office and Private Branch Switching (PBX) systems, for interconnecting the calling parties with the called parties. Typically, a calling party is connected to a switching system which responds to dialing instructions generated by the calling party to selectively interconnecting the calling party with called parties identified by the dialing instructions.

Switching systems are interconnected by communication networks. In this way a customer, who is connected to calling parties of a switching system, can access other switching systems over the communication network.

Currently, in order to provide the telephone users easy access to long-distance services, the majority of PBX systems are configured such that many of the PBX's telephones are assigned various classes of services which provide for high calling privileges, the user just dials the required number.

However, since the advances in computer technology have made electronic information networks a highly efficient tool for business and private sector, the problem of unauthorized access to the network has became more and more significant. This approach leaves the telephones vulnerable to various forms of unauthorized use, both internally and externally, since under this configuration, anyone can use the telephone and the caller can not be identified.

Most PBX's have the ability to employ "authorization codes", each authorization code with its own calling privileges. By issuing individual authorization codes, each with its appropriate access privilege, the telephones can be assigned a more secure toll denim class of service and users making toll calls must prior to dialing the telephone number, use their authorization code which temporarily overrides the telephone's assigned class of service.

The authorization code used to make the call can be included in the call record which allows the call to be correlated to the person placing the call.

Nevertheless, even where authorization codes are used, they are usually kept short (4–6 digits) making it easier for the user to enter the codes, but less secure. To be effective, the codes should be longer (8 or more digits), as the longer the codes are, the better protection could be obtained.

In addition, the current method does not prevent the unauthorized use of another person's authorization code.

Similar problems are encountered by the user's of voice-mail and multimedia systems. Voice-mail and multimedia systems assign mailboxes to individuals, as well as to system functions. Each mailbox has a number and a password. To access the contents of the mailbox, a user must first enter the mailbox number followed by the associated password.

As in the case of the PBX authorization codes, to facilitate user access to the mailbox, the mailbox passwords are kept short. This approach makes it easier for the user but jeopardizes the security of the mail system and its contents.

Currently, to access a voice mailbox, the user must dial the voice-mail telephone number (usually 4 digits) followed by the mailbox number (4 or more digits) followed by the mailbox password (4–16 digits). The use of this sequence of 12 to 24 digits discourages the use of longer mailbox passwords which, in turn, produces a relatively insecure voice-mail system.

Also, as in the case of the authorization codes, this method does not prevent the unauthorized use of another person's mailbox password.

In case of the current generation of cellular telephones a Mobile Identification Number (MIN) is transmitted to the cellular carder at the beginning of each call. The MIN is stored in a resident nonvolatile memory and identifies the user to the cellular network for billing purposes.

However, this approach has some drawbacks. Anyone who has access to the device can place calls and the costs will be applied to the owner of the device. If the device is lost or stolen, it can be used to place calls. As well, a MIN can be easily copied and used in clones of the device. This makes for a very insecure system.

Also, cellular phones that connect to PBX facilities such as long-distance circuits, Direct Inward System Access (DISA), voice-mail or multimedia mailboxes will be confronted with the same access-control problems described earlier for the PBX and voice-mail systems.

Although there are currently some memory-card based telecommunications systems, such as that disclosed in U.S. Pat. No. 4,759,056 to Akiyama, that can be used to store access codes, it does not provide the user with local (terminal level) password protected access to the contents of the card. Once the card is inserted into the card reader, its contents are automatically forwarded, without user password validation. The Akiyama system is convenient but certainly not secure enough for its application.

Another memory-card based system is disclosed in Application for Canadian Patent 2,016,935 to Sato which teaches storing telephone numbers and IDs in a "smart card". However, with this system, when the card is inserted into the card reader the card's speech charge and/or ID is automatically displayed or uttered without user password validation. The system has the convenience of storing telephone numbers and user ID but it does not have the capability to provide secure password access to the contents of the memory device.

SUMMARY OF THE INVENTION

Although the system of the present invention can be applied to any telecommunications environment, the preferred embodiments will deal with the PBX environment, voice-mail and cellular devices, such as cellular telephones.

An object of the present invention is to provide individual users with a secure, password protected easy-to-use method of carrying and utilizing a plurality of access codes and passwords.

Another object of the present invention is to facilitate the use of longer, more secure access codes and passwords.

Another object of this invention is to provide an enhanced security of the PBX's terminals and toll circuits, since the terminals can be assigned a toll restricted class of service which can be temporarily overridden with an authorization code.

Still another object of the present invention is to provide telecommunications administrators and managers with a secure, easy-to-use method of issuing and administering user passwords and access codes, while securing the telecommunications systems from unauthorized use (hereinafter called toll fraud) both internally and externally.

The present invention provides a system and a method for solving the shortcomings or deficiencies in the PBX environment, to fully restrict the telecommunications devices (telephones, etc.) and use long (8 or more digits) authorizations codes that are securely stored in a password protected "smart card" in conjunction with an access-control module connected to the PBX terminals. Such system and method provides the user with a secure, password protected, convenient and user friendly telecommunications access-control system where the "smart card" is used to store and forward the user's authorization code which can temporarily override the terminal's restrictions with the use(s) of its own restriction profile or calling privileges.

In addition, the present invention provides a system and a method for solving the shortcomings or deficiencies in the voice-mail environment to use secure long (8 or more digits) mail-box passwords that are securely stored in a password protected "smart card" and, in conjunction with an access-control module connected to the terminals provide the user with a secure (password protected), convenient, user-friendly access-control system to voice-mail where the "smart card" is used to store and forward the user's mail-box number and password.

According to one aspect of the present invention, there is provided an access-control system for a telecommunications network which connects a serving telecommunications system connected to a plurality of telecommunications access terminals, comprising: (a) at least one portable memory device card, for storing a resident PIN of an user and a corresponding transaction profile defined by a number of access authorization codes and identification data associated with each authorization code, and/or validating a user's PIN; (b) an access-control module comprising: input means for receiving said user's PIN and for selecting a preferred transaction from said transaction profile; means for reading said transaction profile from said card and for reading a selected access authorization code and associated identification data corresponding to said preferred transaction; display means for displaying said transaction profile; means for connecting said module to a telecommunications access terminal for transmitting said selected access authorization code and associated identification data to said serving telecommunications system over said telecommunications network for executing said preferred transaction; and control means for controlling said input means, said means for reading, said display means and said means for connecting, for transmitting said selected access authorization code and associated identification data to said means for connecting.

According to another aspect of the present invention, there is provided a method for accessing and controlling a telecommunications network which connects a serving telecommunications system to a plurality of telecommunications access terminals, comprising the steps of: writing in a portable memory device card, at an authorized central issuing system, a resident PIN and a transaction profile for a user, said transaction profile being defined by a number of access authorization codes and identification data associated to each of said authorization code; introducing said card into a means for reading provided at a telecommunications access terminal; inputting an user's PIN on input means at said telecommunications access terminal and transmitting said users's PIN to said card; validating said user's PIN, reading said transaction profile from said card and displaying said transaction profile on a display means; selecting a preferred transaction on said input means; reading from said card an access authorization code and associated identification data corresponding to said preferred transaction; transmitting said selected access authorization code and associated identification data for said preferred transaction to said telecommunication network.

Advantageously, the system and the method of the present invention provide users with a more secure and user-friendly controlled access to telecommunications facilities such as Private Branch Exchange (PBX) long-distance circuits, Centrex long-distance circuits, cellular circuits, voice-mail and multimedia systems. This is because the present invention greatly facilitates the use of authorization codes, since the user does not have to dial the preambles or long authorization codes.

The user need not even know their authorization code, since it is stored on the "smart card" and automatically dialed by the system when the user selects the appropriate option to place a toll call.

The system and the method provided by the present invention also facilitate voice-mall access procedures since the user does not have to dial the voice-mail telephone number, mailbox number and mailbox password. The PIN stored on the "smart card" and verified by the user during the call introduces a second level of security previously not available. If the card is lost or stolen, it can not be used without the user's PIN.

In addition, the system facilitates and adds a level of security previously unavailable for the distribution of access codes used in the PBX and voice-mail environments, providing for a more secure means of storing and using access codes and the like, than is currently available, thus enhancing the security of the PBX's, mailboxes and cellular phones by use of much longer authorization codes.

Another advantage of this system is that it provides benefits to the telecommunications administrators by facilitating the issuing, distribution and administration of user passwords. Each user is issued a "smart card" that contains a user's Personal identification Number (PIN) plus all of the user's passwords. The telecommunications administrators and managers are provided with a secure, easy-to-use method which will facilitate and extend the use of existing telecommunications features such as authorization codes and voice-mail passwords and add an additional level of security, or password, to prevent the unauthorized use of passwords and access codes. The passwords can include: authorization code for access to long-distance circuits, Direct Inward System Access (DISA) password, calling-card number, telephone-station control password, voice-mail or multimedia mailbox password and account codes.

The card, when used in a cellular device, can also include, when and where permissible, the Mobile Identification Number (MIN) that cellular phones or devices transmit to the cellular carrier at the beginning of each call. The MIN identifies the user to the cellular network for billing purposes.

Still another advantage of the present invention is that since the authorization code is stored on the "smart card", the user does not have to copy his/her code, which in effect would be a compromise.

BRIEF DESCRIPTION OF THE DRAWINGS

These and other features of the invention will become more apparent from the following description in which reference is made to the appended drawings, wherein.

DESCRIPTION OF THE PREFERRED EMBODIMENT

Figure 1:
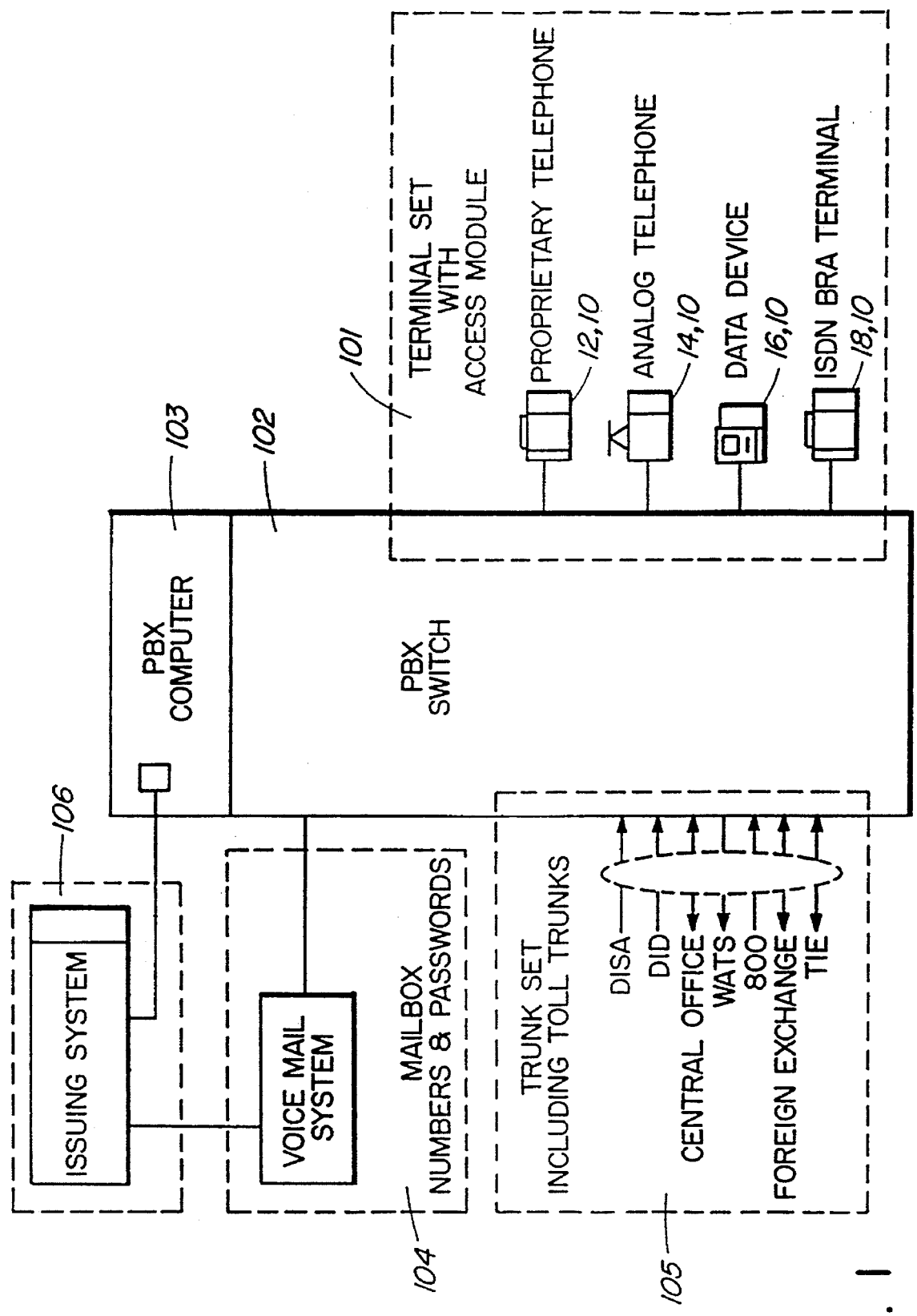
FIG. 1 illustrates a block diagram of the system of the present invention, in a PBX and Voice Processing environments.

FIG. 1 illustrates a block diagram of the system for accessing a PBX and voice processing environments using the smart card and the access module of the present invention.

The smart card is a credit-card size plastic card embedded with a microprocessor and memory which contains an authorization code preamble, a card holder's authorization code, mailbox number and password, and a PIN.

A telecommunications terminal, generally designated with reference numeral 101 is equipped with an access-control module 10 which provides an easy-to-use interface between the password protected "smart card" 100 and its resident access codes, the user and the serving system.

As seen on FIG. 1, the telecommunication terminal could be a proprietary telephone 12, an analog telephone 14, a data device 16 or an integrated service digital network (ISDN) base rate access (BRA) terminal 18. The access-control module 10 can be an add-on module connected to the existing telecommunications terminals or fully integrated into the telecommunications terminals. In either case, the system has a similar configuration. The telecommunication terminal is connected to the PBX switch area 102 for connecting the call. A PBX computer 103 monitors the switch area 102, connecting the call to the voice mail system 104 or to the typical trunk set 105, which includes the toll trunks.

When making a telephone call, namely requiting an access code, the user inserts the card into the access module 10 of the respective terminal 12 to 16, which prompts the user for his or her PIN. The user then enters his or her PIN. The PIN is passed by the access-control module to the smart card which compares the entered PIN to the one stored in the card. If the entered PIN is validated by the "smart card," the module retrieves from the card the user's transaction profile which indicates what type of transactions are available to the user. The transaction profile is displayed so that the user can then select the appropriate transaction key, which is translated by the module 10 to retrieve the appropriate access-control codes (authorization codes and the like), and associated information from the card and transmit the information to the system supporting the telecommunications apparatus being used. If the submitted PIN is not valid, the user is prompted again, until the PIN attempt threshold is exceeded at which time the card is disabled.

The system of the present invention can be used to support access to a voice-mail system by facilitating access to the voice-mail system. The security of the mail voice system is enhanced by storing the voice-mail telephone number, the user's mailbox number and mailbox password on the same "smart card".

With the present invention, to access a mailbox 104, the user inserts the "smart card" 100 into the telephone's access module 12 or 14 which will prompt the user to enter his/her PIN. The PIN is passed by the access-control module 10 to the smart card 100 which compares the entered PIN to the one stored in the card. If the entered PIN is validated by the "smart card", the module 10 retrieves from the card 100 the user's transaction profile which indicates what transactions are available to the user. The transaction profile is indicated on a supporting display unit. In this case the transaction profile is the voice-mail. The user can then select the appropriate transaction key on a supporting key pad, in this case the voice-mail transaction. The transaction is translated by the module 10 to retrieve the appropriate access-control PIN. The transaction automatically forwards the voice-mail telephone number to the PBX 102 and the user's mailbox number and password are transmitted to the voice-mail system 104.

Figure 2:
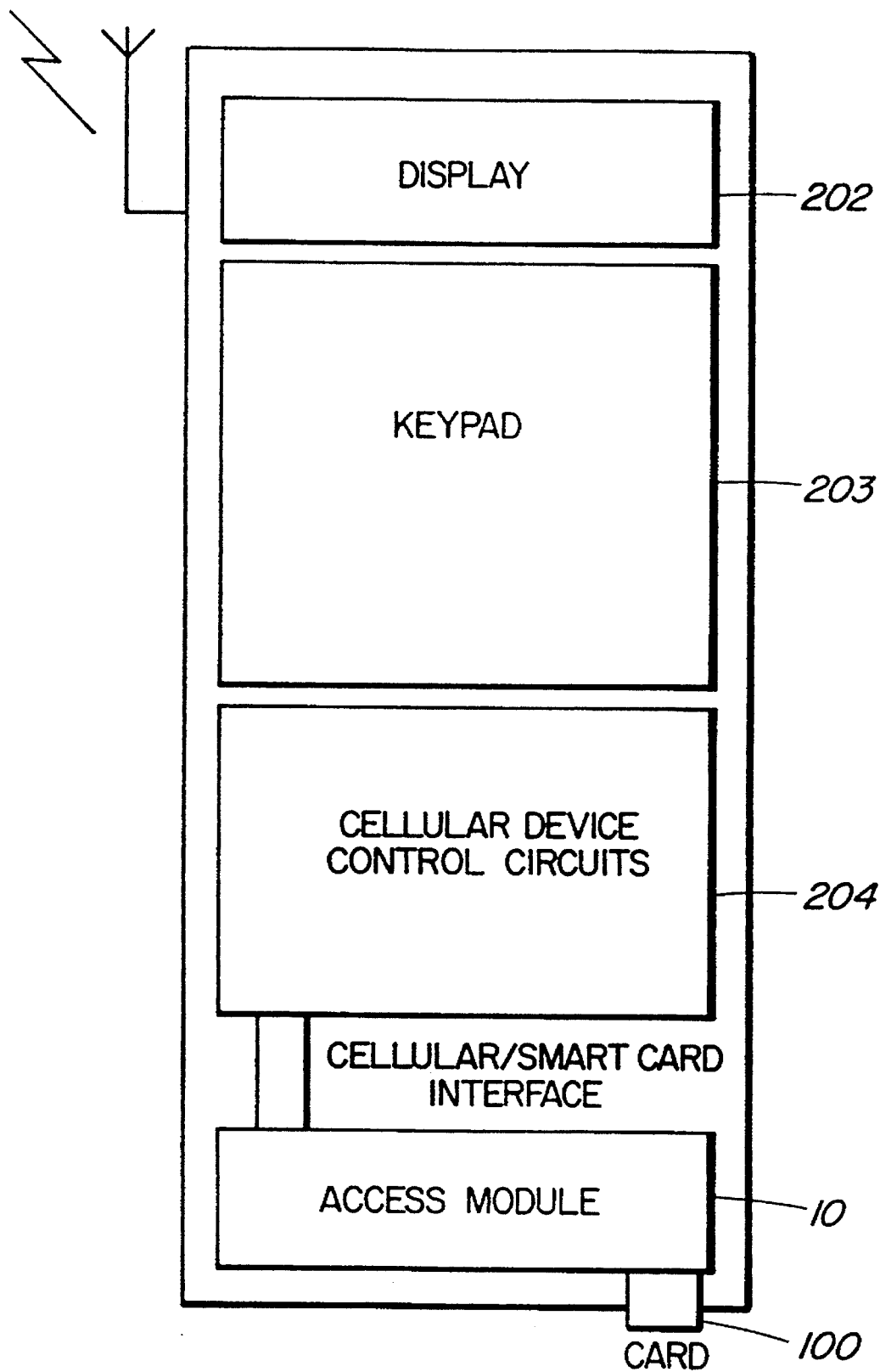
FIG. 2 illustrates a block diagram of the system of the present invention, in a cellular environment.

FIG. 2 illustrates a block diagram of the smart card of the present invention in the case of a cellular phone equipped with an access module 10. In this embodiment the access module 10 is integrated into the cellular phone whose display 202 and key pad 203 supports the user interface for the functions described in connection with the previous embodiment. In the case when the access module 10 is used with cellular phones, the present invention provides that, when and where permissible, the user's MIN will not be stored in the cellular phone's nonvolatile memory, as is currently done. It will be stored in the smart card 100 and loaded into the device's memory 204 once the user has successfully entered the card's PIN.

To place a call with a cellular phone, according to the present invention the user inserts the "smart card" 100 into the cellular device's access module 10 which prompts the user to enter his/her PIN. The access-control module 10 passes the PIN to the smart card 100 which compares the entered PIN to the one stored in the card. If the entered PIN is validated by the "smart card," the module retrieves from the card the user's transaction profile which indicates what transactions are available to the user. In this case, it would indicate cellular call and other transactions.

The transaction profile is indicated on the supporting display unit 202. The user can then select the appropriate transaction key on the key pad 203, which in this case it would be cellular call transaction. The transaction is translated by the module 10 to retrieve and send the user's MIN to the cellular device control circuits 204 to be used in setting up the cellular connection. Once the call is established, the user can also, if required, access and use other transactions available on the smart card. The module passes the access code to the cellular device which transmits the information.

The system of this embodiment provides similar functions and security benefits as the embodiments for the PBX and mail vote, plus the security and benefits derived by also storing the user's MIN.

As it is now apparent, with the present invention the MIN is not stored in the device but is loaded into the device from the card, once the user has entered his or her PIN. If the cellular device is lost or stolen, it can not be used to place a call since it does not have a resident MIN.

Figure 3:
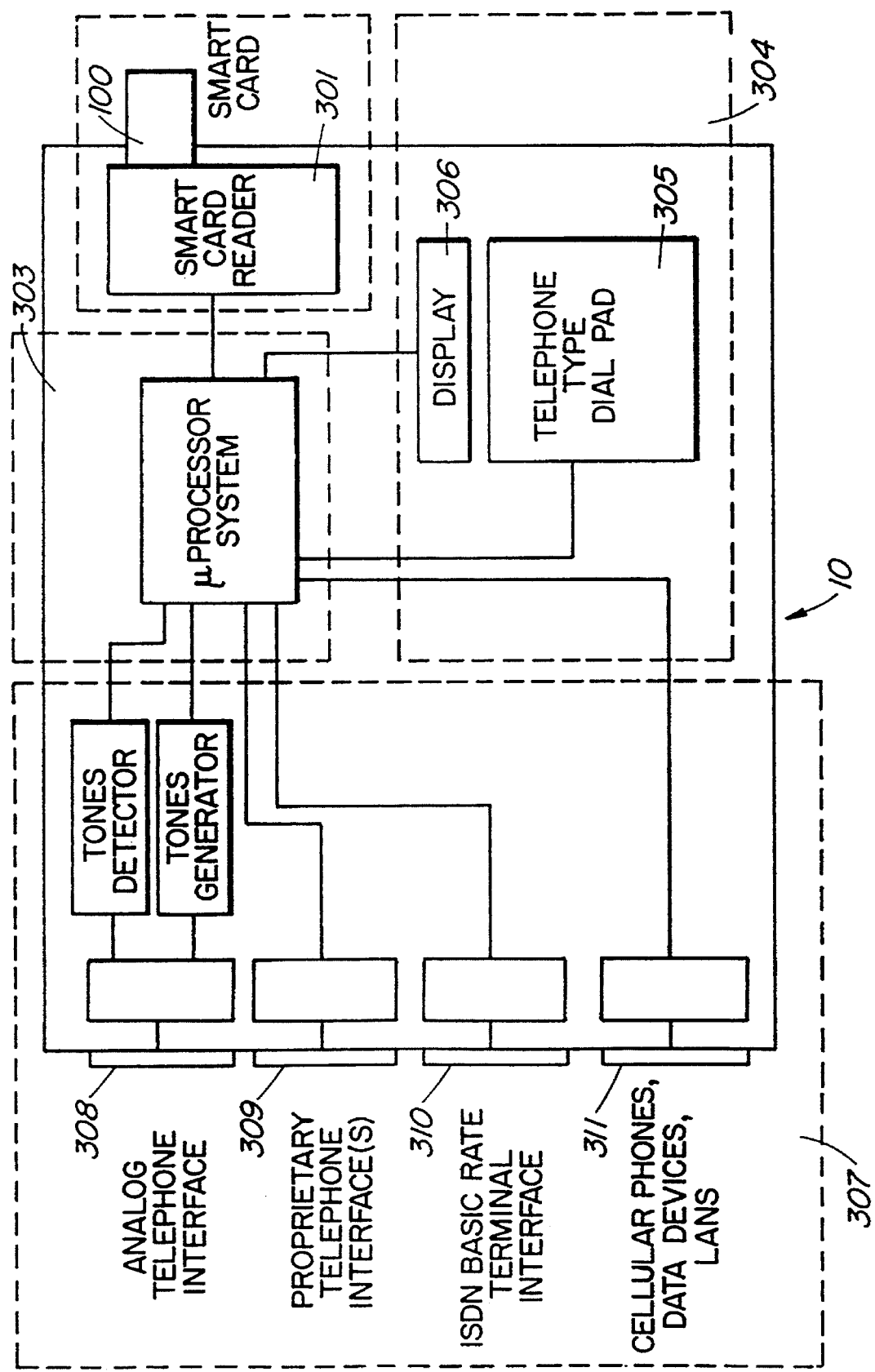
FIG. 3 shows a block diagram of an access module according to the present invention.

FIG. 3 shows a block diagram of the access module. It comprises a smart card reader 301, connected to a microprocessor system 303 which provides intelligent secure support for the transfer of data between the user interface circuits, on the module 304, the smart card 100 and the telecommunication network. The data to be transferred may include an authorization code preamble, authorization code, voice-mail directory number, user mailbox number and password, etc.

The user interface circuits 304 include a telephone type key pad 305 and a visual display 306. The key pad 305 is provided with keys for entering the user's PIN, and with selection keys for the user to select line, voice mail access or other accesses. The visual display system 306 supports the user interaction with the module through the microprocessor system 303.

The microprocessor system 303 communicates through interfaces, generally designated as 307, to provide access to various systems supported by the access module 10. In the embodiment illustrated in FIG. 3, the module 10 facilitates access to an analog telephone interface 308, proprietary telephone interface(s) 309, ISDN basic rate terminal interface 310 and other interfaces 311 for cellular telephones, data devices, LANs, etc.

Figure 4A:
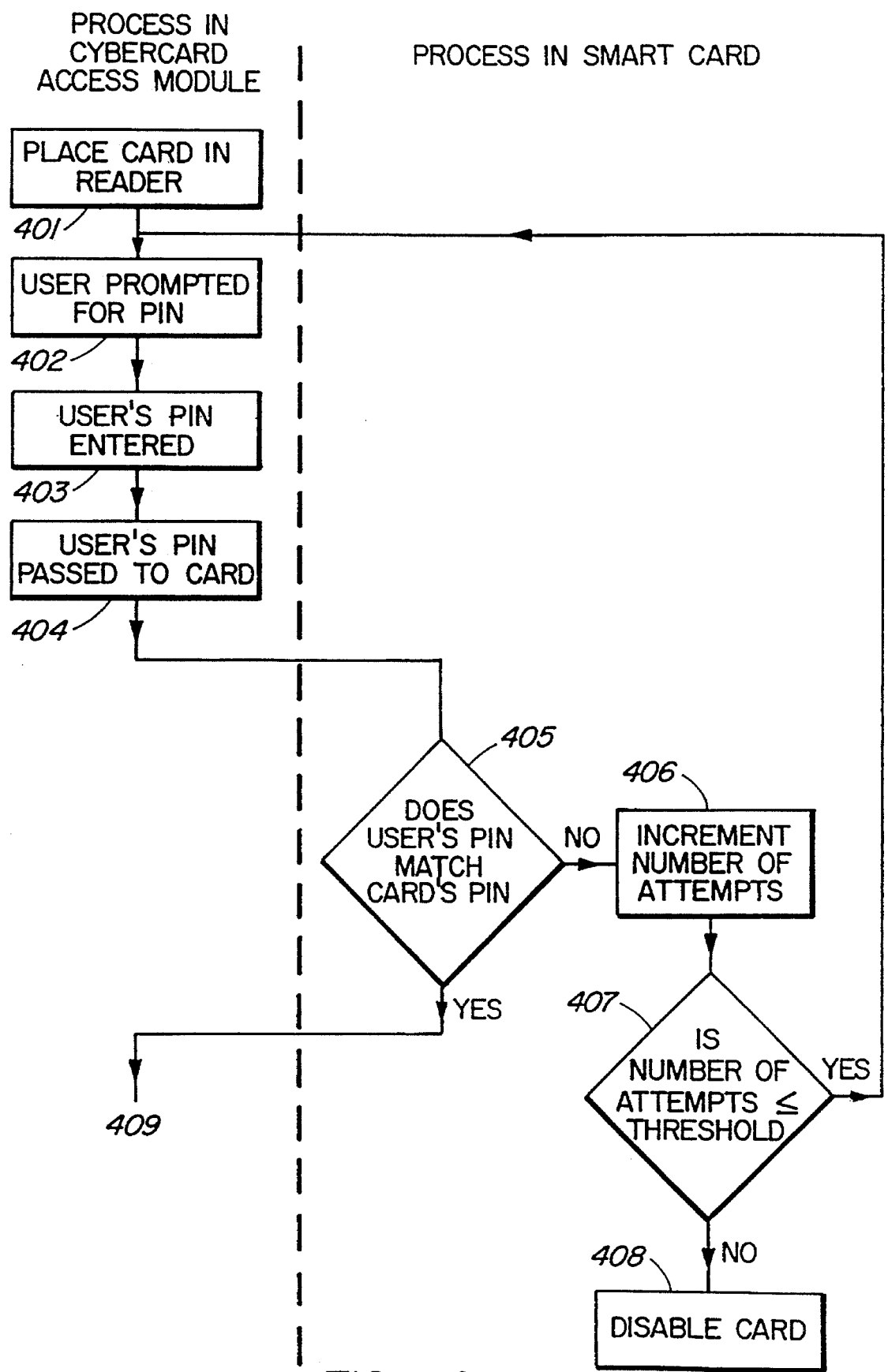
FIG. 4A is the first part of a flow-chart illustrating the method for accessing a serving telecommunications system using a password protected card and access module of the present invention.
Figure 4B:
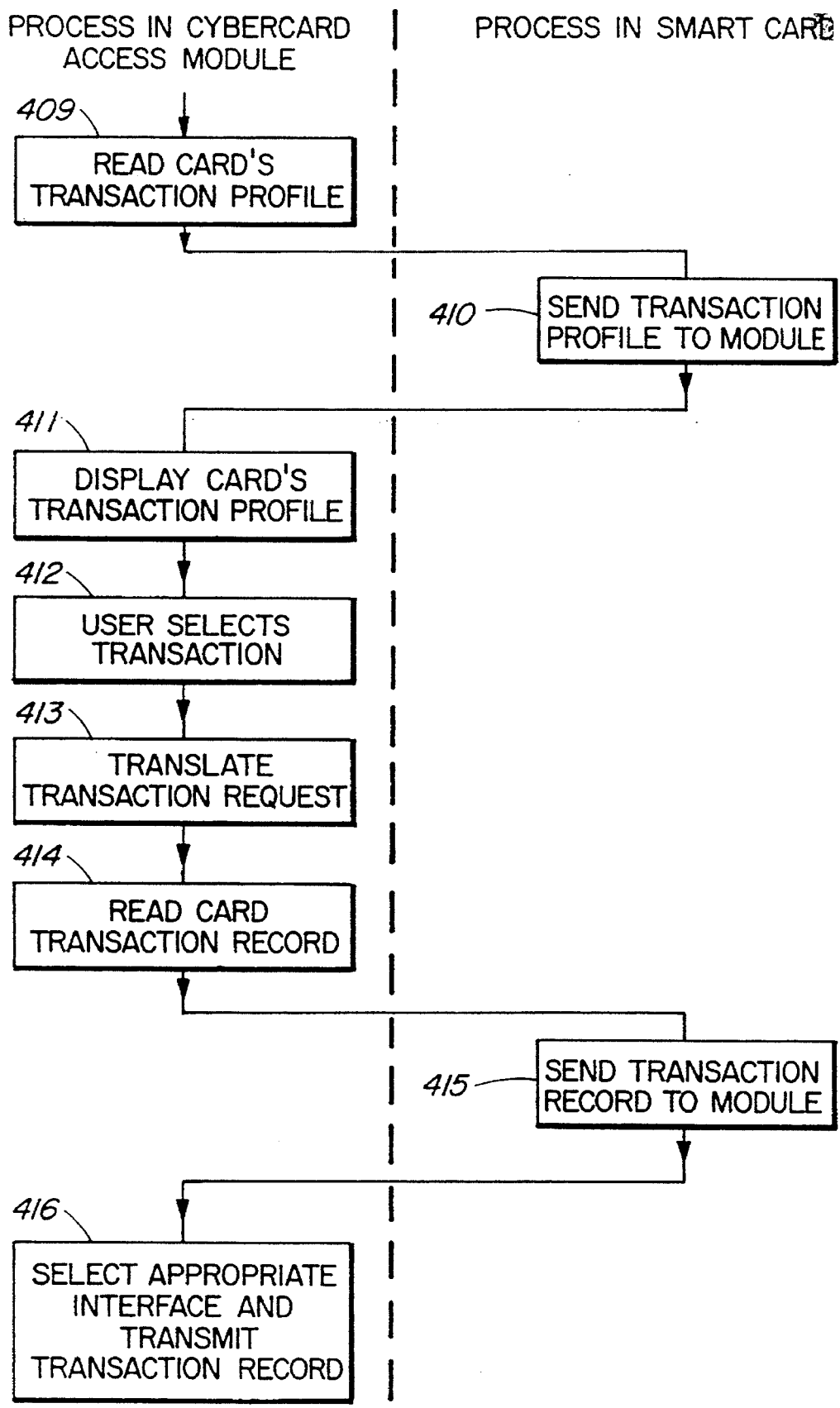
FIG. 4B is the second part of the flow-chart illustrated in FIG. 4A

FIGS. 4A and 4B illustrate the method for using a password protected interface between a serving system and a plurality of access codes resident in a user's memory device. With the present invention, to place a toll call, the user inserts the "smart card" 100 into the telephone's access module in step 401, which prompts the user to enter his/her PIN in steps 402 and 403. The PIN is passed by the access-control module 10 to the smart card 100 in step 404. In step 405 the entered PIN is compared to the one stored in the card. If the entered PIN is validated by the "smart card," the module 10 retrieves from the card 100 the user's transaction profile in step 409, which indicates what transactions are available to the user. In step 410 the transaction profile is send to the module, which displays it in step 411. In this example, the transaction profile indicates that toll-call and voice-mail transactions are permitted. The transaction profile will be indicated on the supporting display unit 306. The user can then select the appropriate transaction key on the key pad in step 412, which will be translated by the module's microprocessor to retrieve the appropriate access-control codes from the card in steps 413 and 414. In this case, the authorization code preamble and authorization code are read from card 100 in step 415 and sent to the PBX's control element in step 416.

If in step 403, the user enters an invalid PIN, a card "PIN attempts" number will be incremented in step 406 and compared the to a card's "PIN attempts threshold" number in step 407. If the "PIN attempts" number is less than or equal to the "PIN attempts threshold" the user is prompted to reenter the PIN in step 402. If the "PIN attempts" number is greater than the "PIN attempts threshold", the card will be disabled in step 408 and the user will have to have the card re-enabled by the system administrator.

Once the access module 100 has forwarded the authorization code preamble and authorization code, the PBX will compare the authorization code received to its database of authorization codes and grant the calling privileges, assigned to the authorization code, to the call. The user then dials the toll number from the telephone's dial pad in the usual manner.

A record of the call, including the authorization code used and the number dialed can be produced. This provides the ability to assign toll calls to individuals, via the authorization codes.

The right of the invention in which an exclusive right or privilege is claimed are defined as follows:

1. An access-control system for a telecommunications network which connects a serving telecommunications system connected to a plurality of telecommunications access terminals, comprising:
    (a) at least one portable memory device card, for storing a resident PIN of an user and a corresponding transaction profile defined by a number of access authorization codes and identification data associated with each authorization code, and for validating a user's PIN;
    (b) an access-control module comprising:
       input means for receiving said user's PIN and for selecting a preferred transaction from said transaction profile;
       means for reading said transaction profile from said card and for reading a selected access authorization code and associated identification data corresponding to said preferred transaction;
       display means for displaying said transaction profile;
       means for connecting said module to a telecommunications access terminal for transmitting said selected access authorization code and associated identification data to said serving telecommunications system over said telecommunications network for executing said preferred transaction; and
       control means for controlling said input means, said means for reading, said display means and said means for connecting, for transmitting said selected access authorization code and associated identification data to said means for connecting.

2. A system as claimed in claim 1, further comprising
    (c) an authorized central issuing system for writing into said card said resident PIN and said number of access authorization codes and associated identification data.

3. A system as claimed in claim 1, wherein said access authorization codes include at least a voice-mail mail box password, a telephone station control password, a mobile identification number for a cellular phone, a bank account code, a credit card number and a preamble code required for an associated access code.

4. A system as claimed in claim 3, wherein said access authorization codes further includes a Mobile Identification Number for identification of a cellular phone user.

5. A system as claimed in claim 1, wherein said telecommunications access terminal is a proprietary telephone and said module is connected thereto through said means for connecting.

6. A system as claimed in claim 1, wherein said telecommunications access terminal is an analogue telephone and said module is connected thereto through said means for connecting.

7. A system as claimed in claim 1, wherein said telecommunications access terminal is a data device or a cellular phone and said module is connected thereto through said means for connecting.

8. A system as claimed in claim 1, wherein said telecommunications access terminal is an ISDN basic rate access terminal and said module is connected thereto through said means for connecting.

9. A system as claimed in claim 1, wherein said means for reading comprises:
    means for receiving and returning said card; and
    a reader for reading from said card said transaction profile when said user's PIN has been validated and for reading said selected access authorization code and identification data when said preferred transaction has been selected.

10. A system as claimed in claim 9, wherein said control means comprises:

means for transmitting said user's PIN to said card for validation;

means for enabling said reader to retrieve from said card said transaction profile when said user's PIN has been validated and said selected access authorization code and associated identification data when said preferred transaction has been selected;

means for enabling said display means to show said preferred transaction; and means for transmitting said selected access authorization code and associated identification data from said card to said means for connecting.

11. A system as claimed in claim 1, wherein said input means is a dial pad.

12. A system as claimed in claim 1, said telecommunications access terminal being of a type provided with a dial pad, wherein said input means is said dial pad of said terminal.

13. A system as claimed in claim 1, said telecommunications access terminal being of a type provided with a dial pad and a display, wherein said dial pad and said display are common to said module and said terminal.

14. An access-control system for a telecommunications network which connects a serving telecommunications system to a plurality of telecommunications access terminals, comprising:

(a) at least one portable memory device card, for storing a resident PIN of an user and a corresponding transaction profile defined by a number of access authorization codes and identification data associated with each of said authorization code, and for validating a user's PIN;

(b) an access-control module, comprising:

input means for receiving said user's PIN and for selecting a preferred transaction from said transaction profile;

means for reading said transaction profile from said card and for reading a selected access authorization code and associated identification data corresponding to said preferred transaction;

display means for displaying said transaction profile;

means for connecting said module to a telecommunications access terminal for transmitting said selected access authorization code and associated identification data to said serving telecommunications system over said telecommunications network for executing said preferred transaction; and control means for controlling said input means, said means for reading, said display means and said means for connecting, for transmitting said selected access authorization code and associated identification data to said means for connecting; and (c) an authorized central issuing system for writing into said card said resident PIN and said number of access authorization codes and associated identification data.

15. An access-control system for a telecommunications network which connects a serving telecommunications system to a plurality of telecommunications access terminals, comprising:

(a) at least one portable memory device card, for storing a resident PIN of an user and a transaction profile defined by a number of access authorization code and corresponding identification data associated with each authorization code, and for validating an user's PIN;

(b) an access-control module comprising:

input means for receiving said user's PIN and for selecting a preferred transaction from said transaction profile;

means for receiving and returning said card;

a reader for reading from said card said transaction profile if said user's PIN has been validated and for reading said access authorization code and associated identification data if said preferred transaction has been selected;

display means for displaying said transaction profile;

means for connecting said module to a telecommunications access terminal for transmitting said selected access authorization code and associated identification data to said serving telecommunications system over said telecommunications network for executing said preferred transaction;

means for transmitting said user's PIN to said card for validation means for enabling said reader to retrieve from said card said transaction profile when said user's PIN has been validated, and said selected access authorization code and associated identification data when said preferred transaction has been selected;

means for enabling said display means to show and select said preferred transaction; and means for transmitting said selected access authorization code and associated identification data from said card to said means for connecting.

16. A method for accessing and controlling a telecommunications network which connects a serving telecommunications system to a plurality of telecommunications access terminals, comprising the steps of:

writing in a portable memory device card, at an authorized central issuing system, a resident PIN and a transaction profile for a user, said transaction profile being defined by a number of access authorization codes and identification data associated to each of said authorization code;

introducing said card into a means for reading provided at a telecommunications access terminal;

inputting an user's PIN on input means at said telecommunications access terminal and transmitting said users's PIN to said card;

validating said user's PIN, reading said transaction profile from said card and displaying said transaction profile on a display means;

selecting a preferred transaction on said input means;

reading from said card an access authorization code and associated identification data corresponding to said preferred transaction;

transmitting said selected access authorization code and associated identification data for said preferred transaction to said telecommunication network.

17. A method as claimed in claim 16, wherein said step of validating comprises:

comparing said user's PIN with said resident PIN and issuing a validation signal when said PIN's coincide; and counting the number of times the user's PIN has been entered and denying user's access to the system if said number exceeds a preset threshold.

18. A method for accessing and controlling a telecommunications network which connects a serving telecommunications system to a plurality of telecommunications access terminals, comprising the steps of:

- writing in a portable memory device card, at an authorized central issuing system, a resident PIN and a transaction profile for a user, said transaction profile being defined by a number of access authorization codes and identification data associated to each of said authorization code;
- introducing said card into a means for reading provided at a telecommunications access terminal;
- inputting an user's PIN on input means at said telecommunications access terminal and transmitting said users's PIN to said card;
- comparing said user's PIN with said resident PIN and issuing a validation signal when said PIN's coincide; and
- counting the number of times the user's PIN has been entered and denying user's access to the system if said number exceeds a preset threshold;
- selecting a preferred transaction on said input means;
- reading from said card an access authorization code and associated identification data corresponding to said preferred transaction;
- transmitting said selected access authorization code and associated identification data for said preferred transaction to said telecommunication network.

* * * * *